No. 829,400. PATENTED AUG. 28, 1906.
J. VON HINKE, DEC'D.
R. VON HINKE, ADMINISTRATOR.
DEVICE FOR AUTOMATICALLY TRACING THE COURSE OF SIGHTED SHIPS.
APPLICATION FILED JUNE 14, 1904.
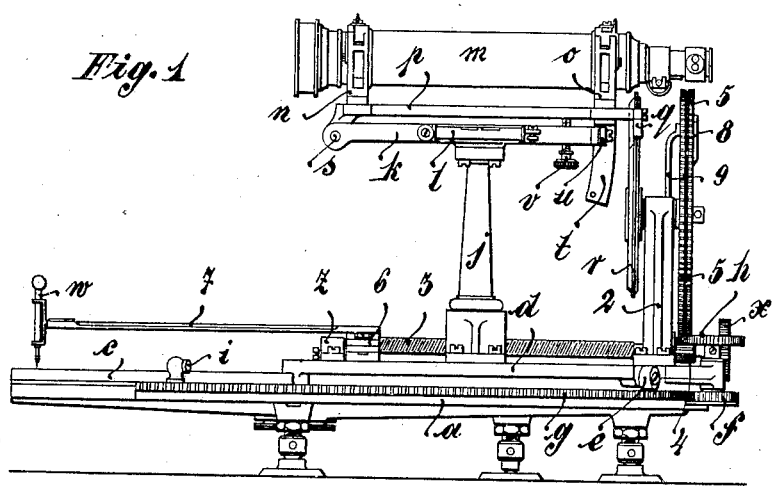
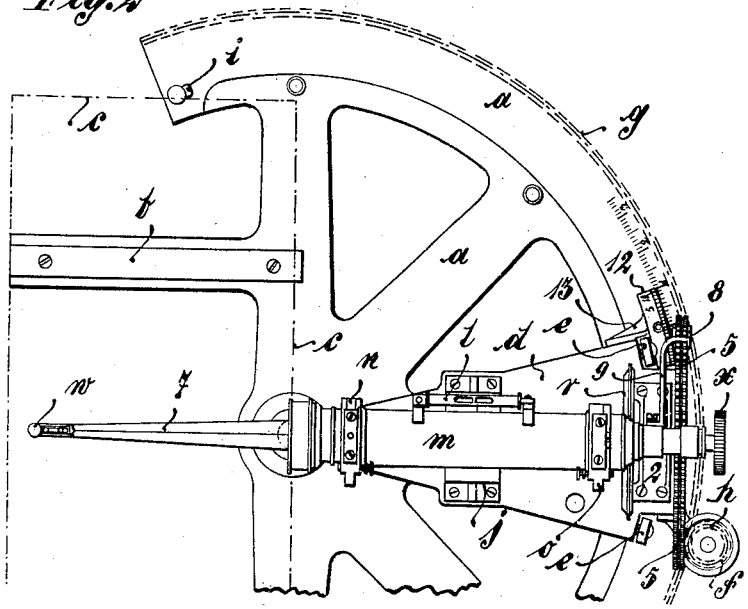
WITNESSES:
Paul Lange.
Carl Krehan.
INVENTOR:
Rudolf Cölln von Hinke obl.
Administrator,
Johann von Hinke, deceased.
THE NORRIS PETERS CO., WASHINGTON, D. C.

UNITED STATES PATENT OFFICE.

RUDOLF VON HINKE, OF VIENNA, AUSTRIA-HUNGARY, ADMINISTRATOR OF JOHANN VON HINKE, DECEASED.

DEVICE FOR AUTOMATICALLY TRACING THE COURSE OF SIGHTED SHIPS.

No. 829,400.        Specification of Letters Patent.        Patented Aug. 28, 1906.

Application filed June 14, 1904. Serial No. 212,790.

*To all whom it may concern:*

Be it known that JOHANN VON HINKE, admiral, late a citizen of Pola, in the Empire of Austria-Hungary, did invent certain new and useful Improvements in Devices for Automatically Tracing the Course of Sighted Ships, of which the following is a specification.

The object of the present invention is a device for automatically tracing the course of sighted ships by means of apparatus for determining position, which device from an elevated point situated on the coast gives the distance, position, and course of the enemy's ships, as well as the requisite data for the setting of the coast-guns.

The apparatus for determining position itself consists, as is well known, of a sighting-telescope which is revoluble about a horizontal and a vertical axis, said telescope being set up on an elevated part of the coast and giving by its inclination to the horizontal the distance of the sighted ship or object to be aimed at. For guiding the telescope a curve disk revoluble about a horizontal axis is employed, the form of this disk embodying the geometrical relationship between the distance of the sighted point and the corresponding angle of dip of the telescope, so that by means of the telescope directed on the point to be aimed at the distance can with the help of an index-mark be read off on a scale rigidly connected with the curve disk, said scale being provided with a circular graduation. This index is arranged on a plate displaceable and adjustable along a scale in order to give on the instrument itself the requisite distance corrections if the instrument be used as an auxiliary for the direction of the firing of a battery. The horizontal turning of the telescope can be read off from the graduations of a horizontal graduated circle along which the alidade connected with the telescope-standard moves.

In order to graphically record the position and the course of the sighted ship by the aid of such an instrument for determining position, according to the present invention, a drawing-board is connected with the fixed foundation-plate on which a pencil is moved. This pencil is fixed on the front end of an arm which turns, in common with the alidade and the telescope, about the vertical axis of the instrument, and at the same time is proportionally to the rotation of the curve disk brought nearer to or moved farther from this axis, so that it gives the course of the ship to a definite scale on the drawing-board.

The accompanying drawings illustrate an apparatus for determining position provided with this device.

Figure 1 is a side elevation, and Fig. 2 is a plan, of the same.

$a$ is the horizontal circle, which is provided on its circumference with graduations. (One division is equal to the angle whose arc is 0.001.) This horizontal circle carries the drawing-table $c$, which is secured on the front carrier $b$, connected with said circle. Along this horizontal circle the alidade $d$ can with its superstructure be turned around a vertical pin, supported in the central bearing of the horizontal circle. The alidade is behind supported by the two rollers and can be moved by means of the toothed wheel $f$, supported in bearing upon it, this toothed wheel engaging in the toothed segment $g$ of the horizontal circle and being connected with a head $h$. The motion of the alidade is laterally limited by the two india-rubber buffers $i$. The pillar $j$, screwed upon the alidade, carries above the bridge $k$ with the alidade spirit-level 1. The terrestrial telescope $m$, provided with cross-threads, lies in bearings $n$ and $o$ of the telescope-carrier $p$. The latter is supported behind with the prismatic edge $q$ on the curve disk $r$ and is turned by means of this about the horizontal axle $s$, which is rigidly connected with the bridge, the telescope-carrier being guided vertically by the guide $t$ and the guiding-rollers $u$.

When the instrument is not standing ready for use, the telescope-carrier rests on the screw $v$. The vertical motion of the telescope takes place at the same time as the radial motion of the pencil $w$ by turning the head $x$. This head is keyed upon a shaft which is formed as a screwed spindle 3 between the bearing-standards $z$ and 2, which are screwed upon the alidade. The turning of the head $x$ is transmitted on the one hand through the differential gear 4 5 to the curve disk $r$, whereas on the other hand the nut 6, which is guided in a straight line, drives the pencil-carrier 7 as well as the pencil $w$. The curve disk is so formed that within a certain range of distance the point of the sea-surface sighted by the telescope is registered on a definite uniform scale.

In order to be able to read off exactly and conveniently the distance of the point sighted at the time the toothed wheel 5 is on its back surface provided with a distance graduation, the distance-pointer 8 belonging thereto is rigidly connected with the alidade by means of the arm 9, while the distance-mark itself is made on a slide.

In order to determine the direction in azimuth of the sighted object the horizontal circle $a$ of the instrument is provided with the graduation mentioned at the beginning. The vernier is situated on the slide 12 of the pointer 13 for the direction in azimuth which, moreover, possesses the same arrangement as the distance-pointer.

The manner of operation of the device for automatically drawing the course of the ship will be understood from the following example of the application of the instrument: A ship is to be shelled indirectly from a coast-battery of mortars. The point at which the apparatus for determining the position is set up is situated at a fairly great distance from the battery. While the battery prepares for action, the object to be aimed at is followed by the sighting apparatus. By a corresponding extension of the course traced by the instrument the commander of the battery determines the particular position of the object in which it is to be struck. He reads the coordinates giving the directions for this point from the register especially arranged for this purpose and informs the battery. Hereupon he ascertains the length of the line representing the course for the time of flight increased by some seconds, sets a pair of compasses at this distance, and steps it back from the intended meeting-point along the produced course and marks the end point of this portion by a pick with the compass-point. As soon as the pencil reaches this mark the order for firing is given.

What is claimed is—

A device for tracing the course of sighted ships, comprising in combination, a horizontal graduated circle having a toothed periphery, a drawing-table secured thereto, an alidade pivoted centrally of the circle, a gear mounted on the alidade and meshing with the teeth of the circle, a pillar mounted on the alidade, a telescope-carrier hinged to the head of the pillar and having a prismatic edged front, a telescope mounted on the carrier, a standard secured to the alidade, an axis mounted in the standard, a cam-disk affixed to this axis and presenting an edge adapted to receive and support the front edge of the telescope-carrier, a screw-spindle mounted in the standard and in a second bearing on the alidade, and having a pinion mounted on it, a toothed graduated disk mounted on the axis of the cam and meshing with the pinion, a nut working on the screw-spindle, a pencil-holder secured to the nut and extending above the drawing-table, a pointer for the said disk-scale, and a pointer for the horizontal circle having a vernier, both pointers being carried by the alidade, substantially as described.

In witness whereof I have hereunto signed my name, this 13th day of May, 1904, in the presence of two subscribing witnesses.

RUDOLF VON HINKE.
*Administrator of the estate of Johann von Hinke, deceased.*

Witnesses:
 ALVESTO S. HOGUE,
 AUGUST FRIGGER.